United States Patent [19]
Nishimura

[11] Patent Number: 5,465,223
[45] Date of Patent: Nov. 7, 1995

[54] BARREL SHIFTER

[75] Inventor: Eiichi Nishimura, Tokyo, Japan

[73] Assignee: Oki Electric Industry Co., Ltd., Tokyo, Japan

[21] Appl. No.: 256,113

[22] PCT Filed: Jan. 11, 1993

[86] PCT No.: PCT/JP93/00025

§ 371 Date: Jun. 24, 1994

§ 102(e) Date: Jun. 24, 1994

[87] PCT Pub. No.: WO93/19456

PCT Pub. Date: Jul. 22, 1993

[30] Foreign Application Priority Data

Jan. 9, 1992 [JP] Japan .................. 4-002045

[51] Int. Cl.[6] .................. G06F 5/01; G06F 7/00
[52] U.S. Cl. .................. 364/715.08
[58] Field of Search .................. 364/715.08

[56] References Cited

U.S. PATENT DOCUMENTS

| 3,747,070 | 7/1973 | Huttenhoff | 364/715.08 |
| 5,155,698 | 10/1992 | Niimi | 364/715.08 |
| 5,262,971 | 11/1993 | Yamaguchi | 364/715.08 |
| 5,309,382 | 5/1994 | Tamura et al. | 364/715.08 |

FOREIGN PATENT DOCUMENTS

| 264130 | 4/1988 | European Pat. Off. . |
| 324374 | 7/1989 | European Pat. Off. . |
| 60-153543A | 8/1985 | Japan . |
| 60-236197A | 11/1985 | Japan . |
| 61-32139A | 2/1986 | Japan . |
| 2-130831A | 5/1990 | Japan . |

OTHER PUBLICATIONS

IBM Technical Disclosure Bulletin, vol. 23, No. 1, Jun. 1980, pp. 120–133, "Algebraic/Logical Shift Matrix", J. E. Gersbach.

Primary Examiner—David H. Malzahn
Attorney, Agent, or Firm—Spencer, Frank & Schneider

[57] ABSTRACT

A left shift tri-state buffer and a right shift tri-state buffer are provided in each of a plurality of barrel-shifter unit circuits which constitute a barrel-shifter, wherein a left or right shift control signal supplied to a left and right shift input terminal enables either of them. As a result, the left or right shift control signal switches between data transfer route from an input terminal to the input end i/o terminal and that from the input terminal to the output end i/o terminal so as to set a left shift or a right shift. It is also possible to shift input data by desired bits which are set by supplying address signals to address terminals to set the shifting amount.

11 Claims, 12 Drawing Sheets

BI-DIRECTIONAL 3-BIT BARREL-SHIFTER ACCORDING TO A FIRST EMBODIMENT OF THE PRESENT INVENTION

BARREL-SHIFTER UNIT CIRCUIT (100 TO 103) IN FIG. 2

BI-DIRECTIONAL 3-BIT BARREL-SHIFTER ACCORDING TO A FIRST
EMBODIMENT OF THE PRESENT INVENTION

CIRCUIT DIAGRAM OF A DECODER 200 IN FIG. 2

BI-DIRECTIONAL 3-BIT BARREL-SHIFTER ACCORDING
TO A SECOND EMBODIMENT OF THE PRESENT INVENTION

BI-DIRECTIONAL 3-BIT BARREL-SHIFTER ACCORDING TO A THIRD EMBODIMENT OF THE PRESENT INVENTION

BARREL-SHIFTER UNIT CIRCUIT (400 TO 403) IN FIG. 5

(400; X = 0, 401; X = 1, 402; X = 2, 403; X = 3)

CIRCUIT DIAGRAM OF A SELECTOR IN FIG. 5

(540 - 542, X = 0, 1, 2)

BI-DIRECTIONAL M-BIT BARREL-SHIFTER
CORRESPONDING TO THE FIRST EMBODIMENT OF THE PRESENT INVENTION

BARREL-SHIFTER UNIT CIRCUIT (200 TO 20M) IN FIG. 8

FIG. 10 BI-DIRECTIONAL M-BIT BARREL-SHIFTER CORRESPONDING TO THE SECOND EMBODIMENT OF THE PRESENT INVENTION

BI-DIRECTIONAL M-BIT BARREL-SHIFTER CORRESPONDING TO THE THIRD EMBODIMENT OF THE PRESENT INVENTION

BARREL-SHIFTER UNIT CIRCUIT (200 TO 20M) IN FIG. 11

CONVENTIONAL RIGHT SHIFT 4-BIT BARREL-SHIFTER

BARREL-SHIFTER UNIT CIRCUIT (10 TO 13) IN FIG. 13

CONVENTIONAL LEFT SHIFT 4-BIT BARREL-SHIFTER

CONVENTIONAL BI-DIRECTIONAL 4-BIT BARREL-SHIFTER

BARREL SHIFTER

TECHNICAL FIELD

The present invention relates to a barrel-shifter which is used for a numeric data processor etc. and is capable of shifting input data by arbitrary bits in either direction of left and right.

BACKGROUND TECHNOLOGY

There have been barrel-shifters of this kind, for example, that disclosed in the Japanese Patent Laid-Open Publication No. 60-236197.

As described in the above reference, the barrel-shifter is a circuit for shifting input data over by desired digits at a time in response to the input data at need, and examples of arrangement thereof are shown in FIGS. 13 to 16.

FIG. 13 is a block diagram exemplifying an arrangement of a conventional right shift 4-bit barrel-shifter.

The right shift 4-bit barrel-shifter comprises four-staged barrel-shifter unit circuits (bit slice) 10 to 13 each having a data length of 4 bits which are connected to one another at each input/output terminal (referred to as an i/o terminal hereinafter) thereof by way of data lines 15. Each of barrel-shifter unit circuits 10 to 13 is designed to be set in shifting amount thereof depending to the address signal produced by a decoder 20.

FIG. 14 is a circuit diagram showing an example of arrangement of each of the barrel-shifter unit circuits 10 to 13 having a data length of 4 bits in FIG. 13.

The barrel-shifter unit circuit having a data length of 4 bits constitutes a bit using a n-channel MOS transistor. That is, the barrel-shifter unit circuit comprises an input terminal I, address terminals A0 to A3 coupled to the output side of the decoder 20, i/o terminals I0 to I3 for coupling the barrel-shifter unit circuits to one another by way of data lines 15, an output terminal O, an input side inverter 29, transfer gates 30 to 33 each composed of an n-channel MOS transistor, a pull-up p-channel MOS transistor 34 coupled to a source potential $V_{cc}$ and an output side inverter 35.

The input terminal I is coupled to the i/o terminal I0 by way of the inverter 29. The address terminals A0 to A3 are coupled to the gate electrodes of the transfer gates 30 to 33 respectively. The transfer gates 30 to 33 are respectively coupled to the i/o terminals I0 to I3 at one terminals thereof and are coupled in common to the input portion of the output side inverter 35 at the other terminals thereof. The output portion of the output side inverter 35 is coupled to the output terminal O.

The operation of the right shift 4-bit barrel-shifter having the above arrangement will be described hereinafter.

In FIG. 13, 4-bit input data DI0 to DI3 input to the input terminals I of the barrel-shifter unit circuit 10 to 13 are shifted fight respectively by desired digits based on the address signal produced by the decoder 20 to be produced from the output terminals O of the barrel-shifter unit circuits 10 to 13 as output data DO0 to DO3 respectively.

FIG. 15 is a block diagram showing the arrangement of a conventional left shift 4-bit barrel-shifter described in the above reference. The left shift 4-bit barrel-shifter shifts input data left by changing the coupling directions of the data lines 15 in the barrel-shifter in FIG. 4.

The barrel-shifter having the arrangement set forth above, however, can shift input data only in either direction of right and left, which is determined by the coupling direction of the data lines 15 between the barrel-shifter unit circuits. As a result, the following ways are needed for realizing a bi-directional data shift.

That is, a first way is preparing the right shift barrel-shifter in FIG. 13 and the left shift barrel-shifter in FIG. 15 respectively and a second way is to provide a circuit arrangement as illustrated in FIG. 16.

FIG. 16 is a block diagram showing an arrangement of a conventional bi-directional data shift 4-bit barrel-shifter, in which selectors 40 to 43 are provided on the input side of the barrel-shifter illustrated in FIG. 14 and selectors 50 to 53 are also provided on the output side thereof to thereby realize the bi-directional data shift by selecting the selectors 40 to 43 and the selectors 50 to 53.

The combination of the right and left barrel-shifters or the circuit arrangement as illustrated in FIG. 16 cause a problem that the number of elements is increased and the circuit scale is enlarged.

DISCLOSURE OF THE INVENTION

It is the first aspect of the present invention to provide a barrel-shifter capable of a bi-directional data shift settling the problem that the circuit scale is enlarged for realizing that.

It is the second aspect of the present invention to provide a barrel-shifter capable of performing the bi-directional data shift comprising a sign extension circuit for performing sign extension at high order bits and a filling zero circuit for filling zero in low order bits, both of which are usually performed in arithmetic circuits.

It is the third aspect of the present invention to provide an area-saving barrel-shifter capable of performing the bi-directional data shift, and filling zero.

A barrel-shifter of the first aspect of the present invention comprises M stages (M≧1, a natural number) of barrel-shifter unit circuits each composed of first to Nth (N≧2, a natural number) i/o nodes, an output terminal, an input terminal, first to Nth switching elements respectively connected between the output terminal and the first to Nth i/o nodes, a left/right shift selection circuit having an input portion connected to the input terminal and output portions connected to the first i/o node and Nth i/o node, wherein the left/fight shift selection circuit receives a right shift signal or a left shift signal and outputs data corresponding to that input to the input terminal to the first i/o node or the Nth i/o node in response to the left shift signal or the right shift signal respectively; characterized in that the barrel-shifter further comprises a decoder circuit for commonly driving the first to Nth switching elements of each stage barrel-shifter unit circuit and for making only one of the first to Nth switching elements conductive and connecting lines for connecting i/o nodes of adjacent barrel-shifter unit circuits to one another wherein the Qth (1≦Q≦(N−1), natural number) connecting line of first to (N−1)th connecting lines between a Pth (1≦P<M) stage and a (P+1)th stage barrel-shifter unit circuits connects the Qth i/o node of the Pth (1≦P<M) stage barrel-shifter unit circuit to the (Q+1)th i/o node of the (P+1)th stage barrel-shifter unit circuit.

A barrel-shifter of the second aspect of the present invention further comprises a sign extension circuit having an input portion connected to the input terminal of the Mth stage barrel-shifter unit circuit and output portions connected to the first to (N−1)th i/o nodes of the Mth stage barrel-shifter unit circuit and a filling zero Circuit having an output portion connected to second to Nth i/o nodes of the first stage barrel-shifter unit circuit among the M stages of barrel-shifter unit circuits and an input portion connected to a node corresponding to zero potential.

A barrel-shifter of the third aspect of the present invention comprises M (M≧1, natural number) stages of barrel-shifter unit circuits each composed of first to Nth i/o nodes (N≧2, natural number), an output terminal, an input terminal, first to Nth switching elements respectively connected between said output terminal and said first to Nth i/o nodes, a left/right shift signal control line for receiving a left or right shift signal, wherein the first stage barrel-shifter unit circuit is connected to the output terminal of the Mth stage barrel-shifter unit circuit at the first i/o node thereof and has a right shift buffer having an input portion connected to the input terminal thereof and an output portion connected to the Nth node thereof, and Rth (2≦P≦M) barrel-shifter unit circuit among the second to (M−1)th barrel-shifter unit circuits has a selection circuit having an input portion connected to the input terminal set forth above and the input terminal of the first barrel-shifter unit circuit and an output portion connected to the first i/o node set forth above and a logic circuit having an input portion connected to the input terminal set forth above and the left/right shift signal control line and an output portion connected to the Nth i/o node and the Mth stage barrel-shifter unit circuit comprises a left shift buffer having an input portion connected to the input terminal of the Mth barrel-shifter unit circuit, a selection circuit having an input portion connected to the input terminals of the Mth stage and first stage barrel-shifter unit circuits and an output portion connected to the first i/o node of the Mth stage barrel-shifter unit circuit and a logic circuit having an input portion connected to the input terminal of the Mth stage barrel-shifter unit circuit and the left/right shift signal control line and an output portion connected to the Nth i/o node.

BEST MODE FOR CARRYING OUT THE INVENTION

[First Embodiment]

Figure 2:
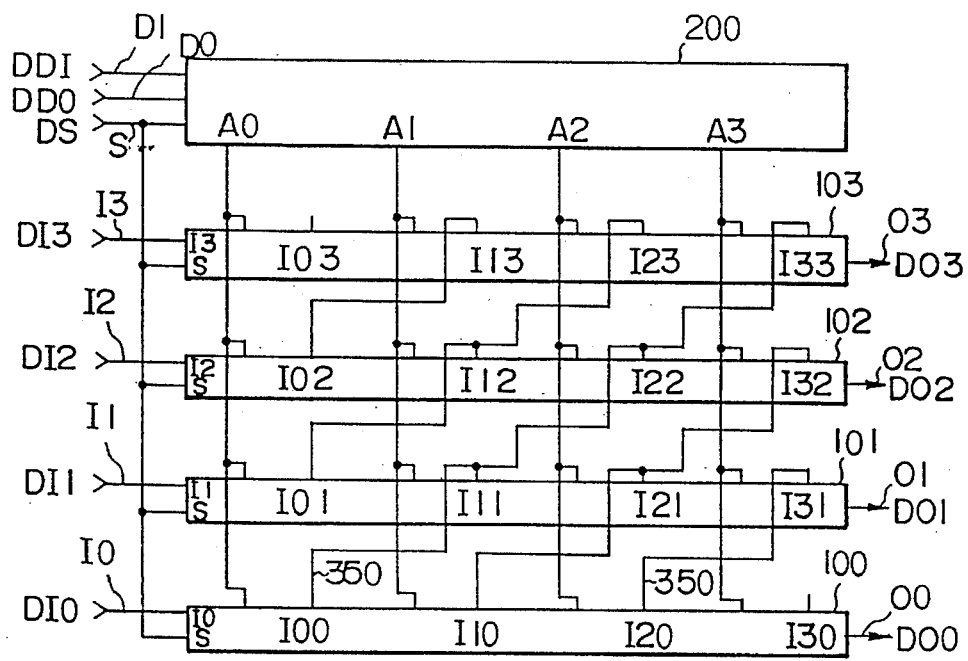
FIG. 2 is a block diagram showing an arrangement of a bi-directional 3-bit barrel-shifter according to the first embodiment of the present invention.

FIG. 2 is a block diagram of a bi-directional 3-bit barrel-shifter according to a first embodiment of the present invention.

The bi-directional 3-bit barrel-shifter is equipped with 4 stages of barrel-shifter unit circuits 100 to 103, which are connected to one another by way of data lines 350. The content of each of the barrel-shifter unit circuits 100 to 103 is shifted by desired digits in response to an address signal supplied by a decoder 200. The decoder 200 receives a left or right shift control signal DS through a left and right shift input terminal S and shift amount data signals DD0 and DD1 are input thereto through shift amount data input terminals D0 and D1. As described above, the sign of signal input to each terminal or output therefrom is indicated by D prefixed to a code representing a terminal corresponding thereto. The left or right shift control signal DS determines a shift direction and the shift amount data signals DD0 and DD1 determine the amount of shift. As a result, input data DI0 to DI3 are shifted by the shift amount to be produced as output data DO0 to DO3 from the output terminals O0 to O3 of the barrel-shifter unit circuits 100 to 103 respectively.

Figure 1:
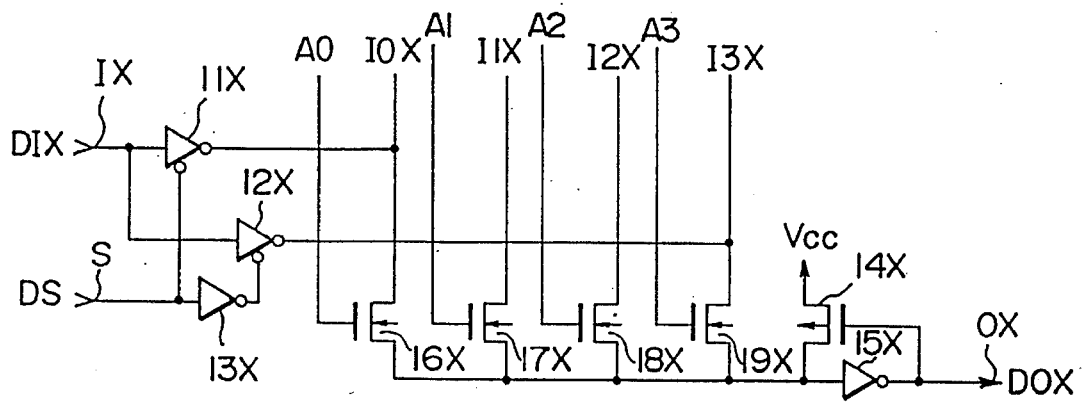
FIG. 1 is a circuit diagram of a barrel-shifter employed in a first embodiment of the present invention.

FIG. 1 is a circuit diagram showing an arrangement of each of the bi-directional barrel-shifter unit circuits 100 to 103 in FIG. 2. The value of X is; X=0 in case of the bi-directional barrel-shifter unit circuit 100; X=1 in case of the bi-directional barrel-shifter unit circuit 101; X=3 in case of the bi-directional barrel-shifter unit circuit 103.

The bi-directional barrel-shifter unit circuit illustrated in FIG. 1 comprises a data input terminal IX to which an input data DIX is input, a left and right shift input terminal S to which a left or right shift control signal DS is input, address terminals A0 to A3 to which address signals DA0 to DA3 are input respectively, i/o terminals (i/o node) I0X to I3X for inputting/outputting data, an output terminal OX for outputting an output data DOX, a tri-state buffer 11X for left shift, a tri-state buffer 12X for right shift, an inverter 13X for inverting the left or right shift control signal DS, transfer gates 16X to 19X each composed of an n-channel MOS transistor, a pull-up MOS transistor 14X and an output inverter 15X.

The data input terminal IX is connected to the i/o terminals 10X to 13X for inputting/outputting data by way of the left shift tri-state buffer 11X and right shift tri-state buffer 12X respectively. The left and right shift input terminal S is connected to the control terminal of the left shift tri-state buffer 11X and is connected by way of the inverter 13X to the control terminal of the right shift tri-state buffer 12X. When the left or right shift control signal DS is logical "0", the tri-state buffer 11X is enabled and the tri-state buffer 12X is disabled so that the output of the tri-state buffer 12X is undefined "Z". When the left or right shift control signal DS is logical "1", the tri-state buffer 12X is enabled and the tri-state buffer 11X is disabled and the output of the tri-state buffer 11X is undefined "Z".

The one terminal alone among the address terminals A0 to A3 is enabled by the decoder 200 illustrated in FIG. 2. That is, logical "1" is input to only one terminal of them which are connected to the gate electrodes of the transfer gates 16X to 19X. Each of the transfer gates 16X to 19X is connected to the i/o terminals (i/o nodes) 10X to 13X for inputting/outputting data at one of the terminals thereof and is connected to the output terminal OX at the other terminal thereof by way of the output inverter 15X. The input and output portions of the output inverter 15X are connected to the source and gate of the pull-up MOS transistor 14X respectively, and the drain of the pull-up MOS transistor 14X is connected to a source potential $V_{cc}$.

Figure 3:
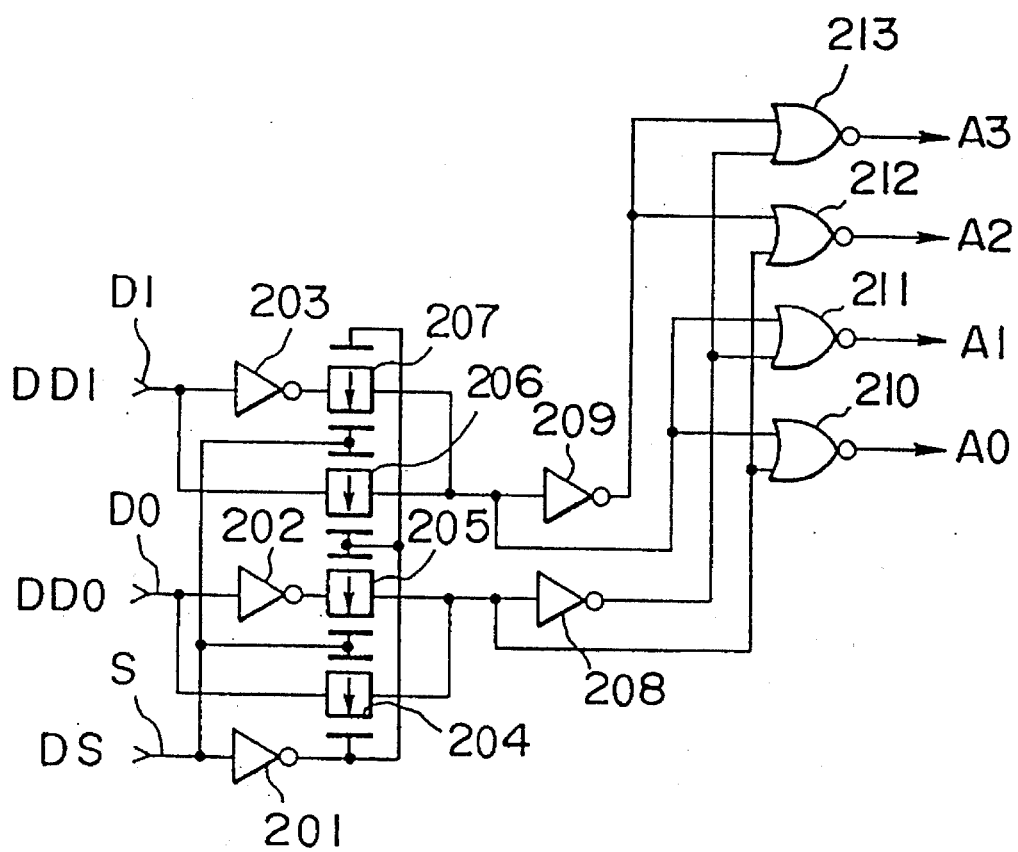
FIG. 3 is a circuit diagram of a decoder in FIG. 2.

FIG. 3 is a circuit diagram showing an arrangement of the decoder 200 in FIG. 2. The decoder 200 which is composed of a conventional decoder and a selector for generating an inverse signal provided on the input side of the former has a function to generate the shift amount of the 3-bit barrel-shifter in FIG. 2. That is, this selector comprises a left and right shift input terminal S, shift amount data input terminals D0 and D1, inverters 201 to 203 respectively connected to the shift amount data input terminals D0 and D1 and PN transfer gates 204 to 207 each composed of an n-channel MOS transistor and a p-channel MOS transistor connected to each other in parallel. The PN transfer gates 205 and 207 are connected to the output portions of the inverters 202 and 203 each at one of the terminals thereof respectively. PN transfer gates 204 and 206 are connected to the shift amount data input terminals D0 and D1 each at one of the terminals thereof respectively. The PN transfer gates 205 to 207 are connected to the output portion or the inverter 201 each at one of the gate terminals thereof and to the left and right shift input terminal S each at the other gate terminal thereof. Moreover, the other terminals of the PN transfer gates 204 and 205 are connected to the input portion of the inverter 208 and the input portions of the two input NOR gates 210 and 212. The other terminals of the PN transfer gates 206 and 207 are connected to the input portion of the inverter 209 and the input portions of the two input NOR gates 210 and 211. The output portions of these inverters 208 and 209 are respectively connected to the input portions of the two input NOR gates 211 and 213 and the two input NOR gates 212 and 213. The output portions of these two-input NOR gates 210 to 213 are connected to the address terminals A0 to A3 respectively as also illustrated in FIGS. 1 and 2. The truth table of the decoder 200 is shown in table 1.

TABLE 1

|  | DS | DD1 | DD0 | A0 | A1 | A2 | A3 | operation |
|---|---|---|---|---|---|---|---|---|
|  | 0 | 0 | 0 | 1 | 0 | 0 | 0 | through |
| left | 0 | 0 | 1 | 0 | 1 | 0 | 0 | left 1-bit shift |
|  | 0 | 1 | 0 | 0 | 0 | 1 | 0 | left 2-bit shift |
|  | 0 | 1 | 1 | 0 | 0 | 0 | 1 | left 3-bit shift |
|  | 1 | 0 | 0 | 0 | 0 | 0 | 1 | through |
| right | 1 | 0 | 1 | 0 | 0 | 1 | 0 | right 1-bit shift |
|  | 1 | 1 | 0 | 0 | 1 | 0 | 0 | right 2-bit shift |
|  | 1 | 1 | 1 | 1 | 0 | 0 | 0 | right 3-bit shift |

The operation of the bi-directional 3-bit barrel-shifter illustrated in FIGS. 1 to 3 will be described hereinafter with reference to a decoder truth table in table 1.

The table 1 (left) shows the left shift operation of the bi-directional 3-bit barrel-shifter, wherein from top to bottom the rows are: through, left 1-bit shift, left 2-bit shift and left 3-bit shift, each corresponding to signals DS, DD1 and DD2 which are input through the left and right shift input terminal S and the shift amount data input terminals D1 and D0. The "through" means an operation to output the input data as it is without shifting the same.

At first, the left 1-bit shift will be described for an example. When signals logical "0", "0" and "1" are input to the left and right shift input terminal S and the shift amount data input terminals D1 and D0, the selectors 204 and 206 in the decoder 200 are enabled and the selectors 205 and 207 are disabled, so that the content of the decoder 200 output by way of the NOR gates 210 to 213 becomes [A0, A1, A2, A3]=[0, 1, 0, 0]. As a result, in the bi-directional barrel-shifter unit circuits 100 to 103 illustrated in FIG. 1, a transfer gate 17X connected to the address terminal A1 alone is enabled. Accordingly, the signals supplied to the i/o terminals I1X of the bi-directional barrel-shifter unit circuits 100 to 103 are inverted by the output inverters 15X therein to be output from the output terminals OX thereof respectively.

Since the left or right shift control signal DS is logical "0", the tristate buffer 11X is enabled so that the input data DIX input to the data input terminal IX is inverted by the tri-state buffer 11X and is output from the i/o terminal I0X (FIG. 1). Hereupon as illustrated in FIG. 2, since the i/o terminal I11 of the barrel-shifter unit circuit 101 is connected to the i/o terminal I00 of the barrel-shifter unit circuit 100, the input data DI0 is output from the output terminal O1 of the barrel-shifter unit circuit 101 as an output data DO1. Since the i/o terminal I12 of the barrel-shifter unit circuit 102 is connected to the i/o terminal I01 of the barrel-shifter unit circuit 101, the input data DI1 is output from the output terminal O2 of the barrel-shifter unit circuit 102 as an output data DO2. Moreover, since the i/o terminal I13 of the barrel-shifter unit circuit 103 is connected to the i/o terminal I02 of the i/o terminal I02, the input data DI2 is output from the output terminal O3 of the barrel-shifter unit circuit 103 as an output data DO3. In this way, the input data DI0, DI1 and DI2 are shifted by one bit left to be output as output data DO1, DO2 and DO3 from the output terminals O1, O2 and O3 of the barrel-shifter unit circuits 101, 102 and 103 respectively.

Generally in an arithmetic circuit, logical "0" is output as an output data DO0 from the output terminal O0 of the barrel-shifter unit circuit 100. Accordingly, lower digits are filled with zero in left shift. The filling zero circuit and the operation thereof will be described in detail in a second embodiment.

Table 1 (fight) shows the fight shift operation of the bi-directional 3-bit barrel-shifter, wherein from top to bottom the rows are: through, right 1-bit shift, right 2-bit shift and right 3-bit shift, each corresponding to signals DS, DD1 and DD2 which are input through the left and right shift input terminal S, the shift amount data input terminals D1 and D0. The right 2-bit shift will be described as an example. When signals logical "0", "0" and "1" are input through the input terminals S, D1 and D0, the output of the decoder 200 becomes {A0, A1, A2, A3]=(0, 1, 0, 0). As a result, in the bi-directional barrel-shifter unit circuits 100 to 103 illustrated in FIG. 1, a transfer gate 17X connected to the address terminal A1 alone is enabled. Accordingly, the signals supplied to the i/o terminals I1X are inverted by the output inverters 15X to be output from the output terminals OX.

Since the input terminal S is at logical "1", the tri-state buffer 12X is enabled so that the input data DIX input to the data input terminal IX is inverted by the tri-state buffer 12X to be output to the i/o terminal I3X (FIG. 1). Since the i/o terminal I11 of the barrel-shifter unit circuit 101 is connected to the i/o terminal I33 of the barrel-shifter unit circuit 103, the input data DI3 is output from the output terminal O1 as an output data DO1. Since the i/o terminal I10 of the barrel-shifter unit circuit 100 is connected to the i/o terminal I32 of the barrel-shifter unit circuit 102, the input data DI2 is output from the output terminal O0 as an output data DO0. In this way, the input data DI3 and DI2 are shifted by two bits right to be output as output data DO1 and DO0 from the output terminals O1 and O0 of the barrel-shifter unit circuits 101 and 100 respectively.

Generally in an arithmetic circuit, the input data DI3 which is input to the data input terminal are output from the output terminals O3 and O2 of the barrel shifter unit circuits 103 and 102 as output data DO3 and DO2 respectively. In this way, the same data as that input to the input terminal of the uppermost barrel-shifter unit circuit is output to high order bits in shifting right (sign extension) the sign extension circuit and the operation thereof will be described in detail in the second embodiment.

The operation of the barrel-shifter has been described above in detail taking examples of left one-bit shift and right 2-bit shift, but through, left 2-bit shift, left 3-bit shift, right 1-bit shift and right 3-bit shift can be performed in the same way by properly selecting the left or right shift control signal DS, shift amount data signals DD0 and DD1 as shown in table 1. Tables 2 and 3 show data output from the output terminals O0 to O3 in shifting left by 1, 2 and 3 bits and in shifting right by 1, 2 and 3 bits respectively.

TABLE 2

| operation | O0 | O1 | O2 | O3 |
|---|---|---|---|---|
| through | DI0 | DI1 | DI2 | DI3 |
| left 1-bit shift | — | DI0 | DI1 | DI2 |
| left 2-bit shift | — | — | DI0 | DI1 |
| left 3-bit shift | — | — | — | DI0 |

TABLE 3

| operation | O0 | O1 | O2 | O3 |
|---|---|---|---|---|
| through | DI0 | DI1 | DI2 | DI3 |
| right 1-bit shift | DI1 | DI2 | DI3 | — |
| right 2-bit shift | DI2 | DI3 | — | — |
| right 3-bit shift | DI3 | — | — | — |

As described above, since each of the bi-directional barrel shifter unit circuits 100 to 103 comprises therein tri-state buffers 11X and 12X which enable bi-directional data shift, it is possible to perform left or right shift in response to the left or right shift control signal DS input to the left and right shift input terminal S of the decoder 200. Since the barrel-shifter is capable of bi-directional data shift only by providing the tri-state buffers 11X and 12X in each of the bi-directional barrel shifter unit circuits 100 to 103, it is possible to reduce the number of additional elements compared with conventional barrel-shifter, restrain the enlargement of the circuit scale and reduce the area of circuit pattern.

[Second Embodiment]

Figure 4:
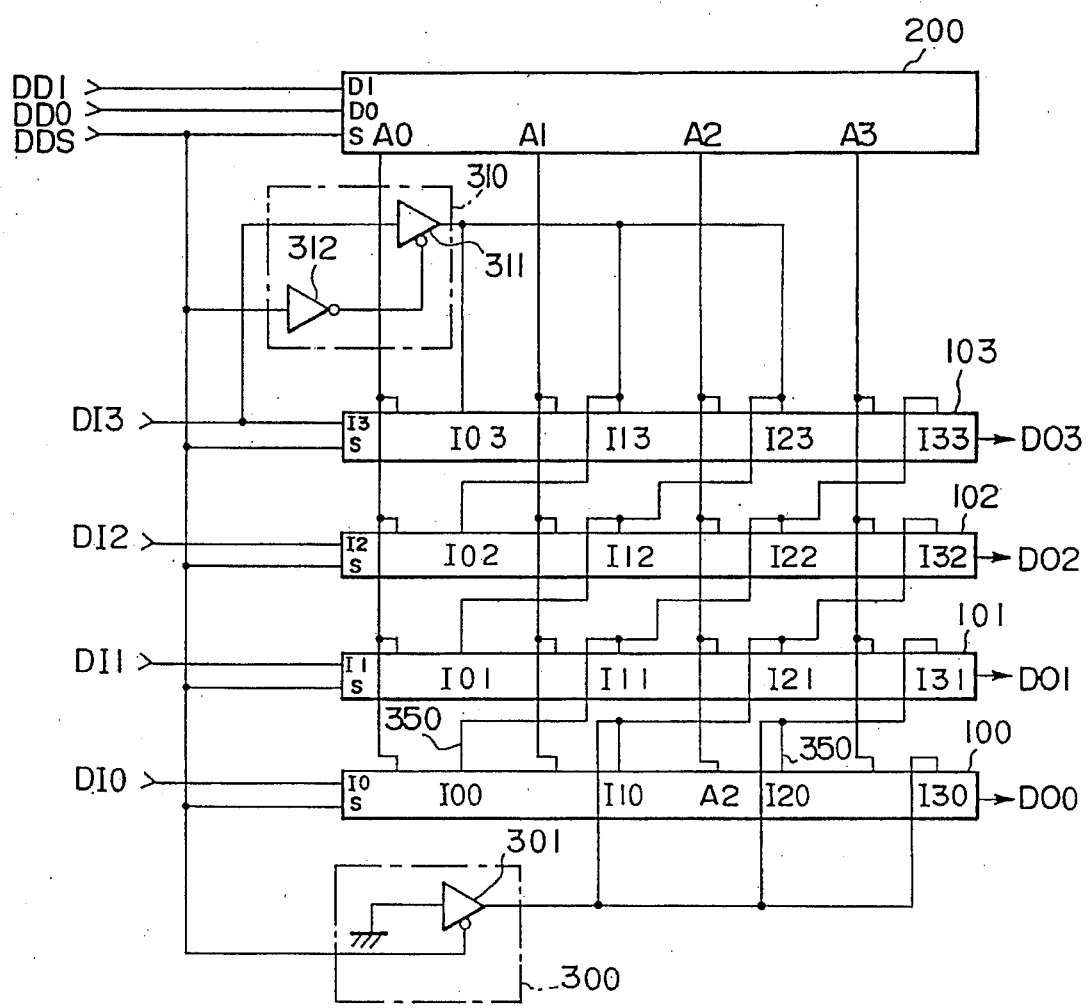
FIG. 4 is a block diagram showing an arrangement of a bi-directional 3-bit barrel-shifter according to a second embodiment of the present invention.

As described above in normal arithmetic circuit, filling zero and sign extension are performed in low order bits by shifting input data left and in high order bits by shifting input data right respectively. These filling zero and sign extension can be performed by connecting a filling zero circuit 300 and a sign extension circuit 310 to the barrel-shifter in FIG. 2 as illustrated in FIG. 4.

The filling zero circuit 300 is composed of a filling zero tri-state buffer 301 which is driven by the left or right shift control signal DS. That is, the control terminal of the filling zero tri-state buffer 301 is connected to the left and right shift input terminal S and is enabled when the left or right shift control signal DS is logical "0". In case of the bi-directional 3-bit barrel-shifter illustrated in FIG. 4, the filling zero tri-state buffer 301 is connected to the i/o terminals I10, I20 and I30 of the barrel shifter unit circuit 100 at the output portion thereof and to the ground at the output portion thereof.

In case of the left 1-bit shift described in the first embodiment, since the transfer gate 170 alone is enabled among the transfer gates 170 to 190 in the barrel-shifter unit circuit 100, the signal input to the i/o terminal I10 is inverted by an inverter 150 to be output from the output terminal O0. Since the left or right shift control signal DS is logical "0", the filling zero tri-state buffer 301 operates so that the i/o terminal I10 of the barrel shifter unit circuit 100 is grounded by way of the filling zero tri-state buffer 301. As a result, logical "0" is output from the output terminal O0 as the output data DO0. The output portion of the inverter in the filling zero tri-state buffer 301 may be connected to an i/o terminal other than that connected to the left shift tri-state buffer of the lowermost barrel-shifter unit circuit.

The sign extension circuit 310 is composed of a sign extension tri-state buffer 311 and an inverter 312 for inverting a left or right shift control signal and the sign extension tri-state buffer 311 is driven by an inverted left or right shift control signal. That is, the control terminal of the sign extension tri-state buffer 311 is connected to the output portion of the inverter 312 and the input portion of the sign extension tri-state buffer 311 is connected to the left and right shift input terminal S. When the left or right shift control signal DS input to the left and right shift input terminal S is logical "1", the left or right shift control signal DS is inverted by the inverter 312 and is input to the control terminal of the sign extension tri-state buffer 311. At that time, the sign extension tri-state buffer 311 is enabled. In case of the bi-directional 3-bit barrel-shifter illustrated in FIG. 4, the output portion of the sign extension tri-state buffer 311 is connected to the i/o terminals I03, I13 and I23 of the barrel shifter unit circuit 103 and the input portion of the filling zero tri-state buffer 301 is connected to an input terminal I3.

In case of the right 2-bit shift described in the first embodiment, since the transfer gates 173 and 172 of the barrel-shifter unit circuits 103 and 102 are enabled, signals input to the i/o terminals I13 and I12 are inverted by inverters 153 and 152 to be output from the output terminals O3 and O2 respectively. Since the sign extension tri-state buffer 311 is enabled, the i/o terminals I13 and I23 of the barrel shifter unit circuit 103 are connected to the input terminal I3 by way of the sign extension tri-state buffer 311. The i/o terminal I23 is connected to the i/o terminal I12 of the barrel shifter unit circuit 102. As a result, an input data DI3 input to the input terminal I3 is output from the output terminals O3 and O2 as the output data DO3 and DO2. The output portion of the sign extension tri-state buffer 311 may be connected to an i/o terminal other than that connected to the right shift tri-state buffer among the i/o terminals of the uppermost barrel-shifter unit circuit.

Although left 1-bit shift and right 2-bit shift are described for examples above, the filling zero or sign extension is also performed in the same way in case of left 2-bit, left 3-bit, right 1- bit and right 3-bit shifts. Tables 4 and 5 show data output from the output terminals O0 to O3 in case of the left 1-, 2- and 3-bit shifts and the right 1-, 2-I -, 2 - and 3 - bit shifts respectively.

TABLE 4

| operation | O0 | O1 | O2 | O3 |
| --- | --- | --- | --- | --- |
| through | DI0 | DI1 | DI2 | DI3 |
| left 1-bit shift | 0 | DI0 | DI1 | DI2 |
| left 2-bit shift | 0 | 0 | DI0 | DI1 |
| left 3-bit shift | 0 | 0 | 0 | 0 |

TABLE 5

| operation | O0 | O1 | O2 | O3 |
| --- | --- | --- | --- | --- |
| through | DI0 | DI1 | DI2 | DI3 |
| right 1-bit shift | DI1 | DI2 | DI3 | DI3 |
| right 2-bit shift | DI2 | DI3 | DI3 | DI3 |
| right 3-bit shift | DI3 | DI3 | DI3 | DI3 |

As described above, according to the second embodiment, the bi-directional barrel-shifter circuit is provided with a sign extension circuit for outputting the input data of the uppermost barrel-shifter unit circuit to i/o terminals thereof that are not connected to the right shift tri-state buffer in right shift. As a result, it is possible to output the same data as the input data of the uppermost input data to the high order bits in right shift (sign extension). The bi-directional barrel-shifter circuit is also provided with a filling zero circuit for outputting the ground level logical "0" to the i/o terminals of the lowermost barrel-shifter unit circuit, the i/o terminals being not connected to the right shift tri-state buffer thereof in left shift. As a result, it is possible to fill the low order bits with zero in left shift.

The data output from the low or high order bits of the bi-directional barrel-shifter circuit in left shift or right shift respectively can be properly selected by connecting the input portion of the filling zero tri-state buffer 301 of the filling zero circuit or that of the inverter of the sign extension circuit 310 to the power source or the ground respectively.

[Third Embodiment]

Figure 5:
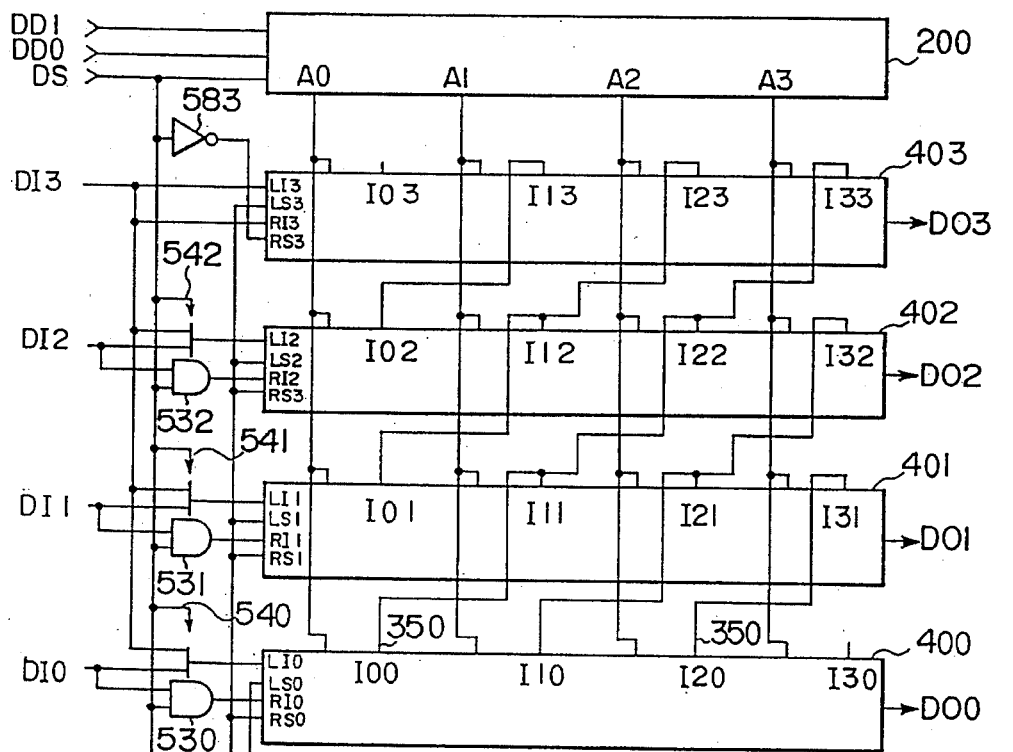
FIG. 5 is a bi-directional 3-bit barrel-shifter according to a third embodiment of the present invention.

FIG. 5 is a block diagram showing an arrangement of a bi-directional 3-bit barrel-shifter according to a third embodiment of the present invention the same components as those in FIG. 2 are denoted at same numerals.

The bi-directional 3-bit barrel-shifter comprises four-staged barrel-shifter unit circuits 400 to 403, which are connected to one another by way of data lines 350 at the i/o terminals thereof. The input data DI0 to DI3 which are input to the I/O terminals I0 to I3 of the barrel-shifter unit circuits 400 to 403 are shifted by desired digits in response to address signals DA0 to DA3 supplied by the decoder 200 to be output from the output terminals O0 to O3 of the barrel-shifter unit circuits 400 to 403 as output data DO0 to DO3 respectively. At that;time, the left or right shift control signal DS which is input to the left and right shift input terminal S sets the shifting direction and the shifting amount data signals DD0 and DD1 which are input to the shift amount data input terminals D1 and D0 determine the shifting amount.

The decoder 200 can have a circuit arrangement similar to that described in the first embodiment with reference to FIG. 3.

Then the arrangement of the barrel-shifter unit circuits 400 to 403 will be described hereinafter.

Figure 6:
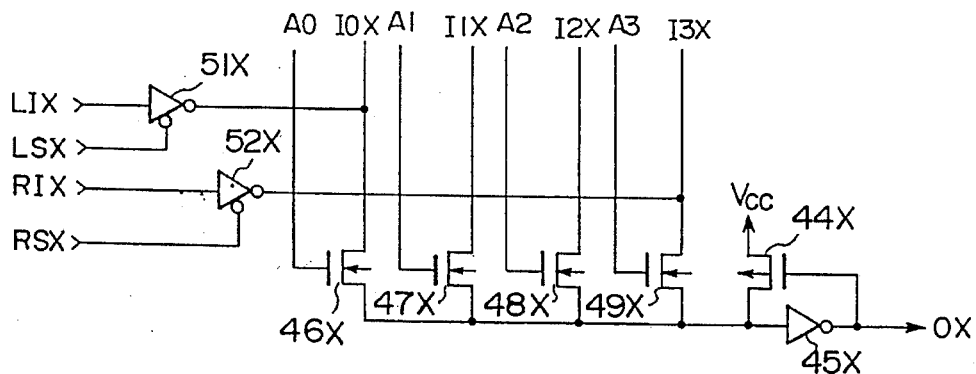
FIG. 6 is a circuit diagram of a barrel-shifter unit circuit in FIG. 5.

FIG. 6 is a circuit diagram showing an arrangement of the barrel-shifter unit circuits 400 to 403 of the barrel-shifter illustrated in FIG. 5. The values of X described hereinafter are: X=0 in case of the barrel-shifter unit circuit 400, X=1 in case of the barrel-shifter unit circuit 401, X=2 in case of the barrel-shifter unit circuit 402 and X=3 in case of the barrel-shifter unit circuit 403.

The barrel-shifter unit circuit illustrated in FIG. 6 comprises a select signal terminal LIX, a logical signal terminal RIX, a select signal control terminal LSX, a logical signal control terminal RSX, address terminals A0 to A3 for receiving address signals, i/o terminals I0X to I3X for inputting/outputting data, an output terminal OX for outputting data, a left shift tri-state buffer 51X, a right shift tri-state buffer 52X, transfer gates 46X to 49X each composed of an n-channel MOS transistor, a pull-up MOS transistor 44X, an output inverter 45X and an output terminal OX.

The select signal terminal LIX is connected to the i/o terminal I0X by way of the left shift tri-state buffer 51X. The logical signal terminal RIX is connected to the i/o terminal I3X by way of the fight shift tri-state buffer 52X. The select signal control terminal LSX and the logical signal control terminal RSX are connected to the control terminals of the left and right shift tri-state buffers 51X and 52X respectively. When a signal input to the select signal control terminal LSX is logical "0", the left shift tristate buffer 51X is enabled, and when a signal input to the logical signal control terminal RSX is logical "0", the right shift tri-state buffer 52X is enabled.

Address signals output from the decoder 200 illustrated in FIG. 3 are input to the address terminals A0 to A3, only one of which is enabled and is connected to the gate electrodes of the transfer gates 46X to 49X. The transfer gates 46X to 49X are connected to the i/o terminals (i/o nodes) I0X to I3X each at one of the terminals thereof, while are connected in common to the input portion of the output inverter 45X at the other terminals thereof respectively. The output inverter 45X is connected to the output terminal OX at the output portion thereof. The output inverter 45X is connected to the source and gate of the MOS transistor 44X at the input and output portions thereof respectively, and the drain of the MOS transistor 44X is connected to the power source $V_{cc}$.

Figure 7:
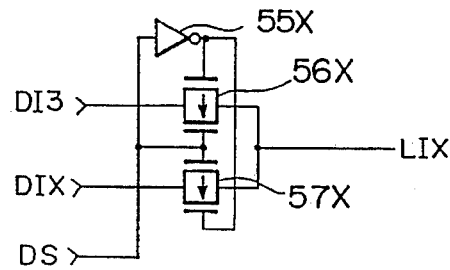
FIG. 7 is a circuit diagram of a selector in FIG. 5.

The barrel-shifter unit circuits 400 to 402 (X=0, 1, 2) of the barrel-shifter unit circuits 400 to 403 are connected to two input AND circuits 530 to 532, which fill the low order bits with zero in left shift and participate in shift operation in right shift, and to selectors 540 to 542 which perform sign extension in high order bits in right shift and participate in shift operation in left shift respectively. At first, the two input AND circuits 530 to 532 are connected to the I/O terminals I0, I1 and I2 each at one of the input terminals thereof, while are connected in common to the left and right shift input terminal S at the other input terminals thereof respectively. The output terminals of the two input AND circuits 530 to 532 are connected to the logical signal terminals RI0 to RI3 of the barrel-shifter unit circuits 400,401 and 402 respectively. The selectors 540 to 542 which are 2 - 1 sectors for selecting either of two input signals are connected to the I/O terminals I0, I1 and I2 each at one of the input terminals thereof and are connected in common to the input terminal I3 at the other input terminals thereof respectively. The output terminals of the selectors 540 to 542 are connected to the select signal terminals LI0 to LI2 of the barrel-shifter unit circuits 400, 401 and 402 respectively. The selectors 540 to 542 are driven by the left or right shift control signal DS. That is, the selectors 540 to 542 comprise PN transfer gates 56X and 57X each composed of an n-channel MOS transistor and a p-channel MOS transistor connected to each other in parallel are connected to the left and right shift input terminal S each at one gate thereof and are connected thereto by way of an inverter 55X at the other gates thereof respectively as illustrated in FIG. 7.

The select signal terminal LI3 and logical signal terminal RI3 of the barrel-shifter unit circuit 403 are connected in common to the input terminal I3.

Moreover, the logical signal control terminals RS0 to RS3 and select signal control terminals LS0 to LS3 of the barrel-shifter unit circuits 400 to 403 are grounded excepting the select signal control terminal LS0 of the barrel-shifter unit circuit 400 and the logical signal control terminal RS3 of the barrel-shifter unit circuit 403 (LS1 to LS3, RS0 to RS2). The select signal control terminal LS0 of the barrel-shifter unit circuit 400 is connected to the left and fight shift input terminal S and the logical signal control terminal RS3 of the barrel-shifter unit circuit 403 is connected to the output portion of an inverter 583 which is connected to the left and right shift input terminal S at the input portion thereof.

The operation of the bi-directional 3-bit barrel-shifter illustrated in FIGS. 5 to 7 will be described hereinafter. It will be explained with reference to table 1 likewise in the first embodiment since the truth table is the same as table 1. At first, table 1 (left) shows the left shift operation of the bi-directional 3-bit barrel-shifter, wherein from top to bottom the rows are: through, left 1-bit shift, left 2-bit shift and left 3-bit shift, each corresponding to the left or fight shift control signal DS and shift amount data signals DD1 and DD0.

The left 1-bit shift will be described for an example. When signals logical "0", "0" and "1" are input to the left and fight shift input terminal S and the shift amount data input terminals D1 and D0, the output of the decoder 200 becomes {A0, A1, A2, A3}={0, 1, 0, 0} (FIG. 2). As a result, in the bi-directional barrel-shifter unit circuits 400 to 403, a transfer gate 47X connected to the address terminal A1 alone is enabled. Accordingly, the signals supplied to the i/o terminals I1X of the bi-directional barrel-shifter unit circuits 400 to 403 are inverted by the output inverters 45X therein to be output from the output terminals OX thereof respectively.

Since the left or fight shift control signal DS is logical "0", the tri-state gate 57X of selectors 540 to 542 illustrated in FIG. 7 is enabled so that the input data DIX (X=0, 1, 2) of each barrel-shifter unit circuit is selected. As a result, the input data DIX (X=0, 1, 2) of each barrel-shifter unit circuit is input to the select signal terminal LIX (X=0, 1, 2) thereof. Since the left or right shift control signal DS is logical "0", the AND circuits 530 to 532 output logical "0". Accordingly, logical "0" is input to the input terminals RI0 to RI2.

At first, the left or right shift control signal "DS=0" is input to the select signal control terminal LS0 of the barrel-shifter unit circuit 400. Since logical "0" is input to the logical signal control terminal RS0 from the ground, a left shift tri-state buffer 510 and a right shift tri-state buffer 520 are enabled. As a result, the input data DI0 input to the select signal terminal LI0 is inverted by the left shift tri-state buffer 510 to be output from the i/o terminal I00 while the logical "0" input to the input terminals RI0 to RI2 is inverted by the fight shift tri-state buffer 520 to be output from the i/o terminal I30.

Moreover, the input data DI1 and DI2 are input to the select signal terminals LI1 and LI2 of the barrel-shifter unit circuits 401 and 402 and logical "0" is input to the logical signal terminals RI1 and RI2 thereof respectively. Since logical "0" is input to the select signal control terminals LS1 and LS2 and the logical signal control terminals RS1 and RS2 from the ground, right shift tri-state buffers 521 and 522 and left shift tri-state buffers 511 and 512 are enabled. As a result, the input data DI1 and DI2 input to the logical signal terminals RI1 and RI2 are inverted by the left shift tri-state buffers 511 and 512 to be output from the i/o terminals I01 and I02 respectively. Logical "0" input to the logical signal terminals RI1 and RI2 are inverted by the right shift tri-state buffers 521 and 522 to be output from the i/o terminals I31 and I32 respectively.

The input data DI3 is input to the select signal terminal LI3 and logical signal terminal RI3 of the barrel-shifter unit circuit 403. Since the left or fight shift control signal "DS=0" is inverted by an inverter 583 to be input to the logical signal control terminal RS3, a left shift tri-state buffer 523 is disabled. Since logical "0" is input to the select signal control terminal LS3 from the ground, a left shift tri-state buffer 513 is disabled. As a result, the input data DI3 input to the select signal terminal LI3 is inverted by the left shift tri-state buffer 513 to be output from the i/o terminal I03.

Hereupon, since the i/o terminal I11 of the barrel-shifter unit circuit 401 is connected to the i/o terminal I00 of the barrel-shifter unit circuit 400, the input data DI0 is output from the output terminal O1 of the barrel-shifter unit circuit 401 as the output data DO1. Since the i/o terminal I12 of the barrel-shifter unit circuit 402 is connected to the i/o terminal I01 of the barrel-shifter unit circuit 401, the input data DI1 is output from the output terminal O2 of the barrel-shifter unit circuit 402 as the output data DO2. Moreover, since the i/o terminal I13 of the barrel-shifter unit circuit 403 is connected to the terminal I02 of the barrel-shifter unit circuit 402, the input data DI2 is output from the output terminal O3 of the barrel-shifter unit circuit 403 as the output data DO3.

Accordingly, the input data DI0, DI1 and DI2 are output from the output terminals O1, O2 and O3 of the barrel shifter unit circuits 101, 102 and 103 as the output data DO1, DO2 and DO3 respectively.

Since the i/o terminal I32 of the barrel;shifter unit circuit 402 is connected to the i/o terminal I10 of the barrel-shifter unit circuit 400, logical "0" is output from the output terminal O0 of the barrel-shifter unit circuit 400. In this way, the low order bits are filled with zero.

Table 1 (right) shows the right shift operation of the bi-directional 3-bit barrel-shifter, wherein from top to bottom the rows are: through, right 1-bit shift, fight 2-bit shift and right 3-bit shift, each corresponding to the left or right shift control signal DS, shift amount data signals DD1 and DD0.

The right 2-bit shift will be described for an example. When signals logical "0", "0" and "1" are input to the left and fight shift input terminal S and the shift amount data input terminals D1 and D0, the output of the decoder 200 becomes {A0, A1, A2, A3}={0, 1, 0, 0}. As a result, in the bi-directional barrel-shifter unit circuits 400 to 403 illustrated in FIG. 6, a transfer gate 47X connected to the address terminal A1 alone is enabled. Accordingly, the signal supplied to the i/o terminal I1X of the bi-directional barrel-shifter unit circuit 40X is inverted by inverter 45X therein to be output from the output terminals OX thereof (X=0, 1, 2, 3).

Since the left or right shift control signal DS is logical "1", the PN transfer gate 57X of selectors 540 to 542 illustrated in FIG. 7 is enabled so that the input data DI3 of the barrel-shifter unit circuit 403 is selected. As a result, the input data DI3 is input to the select signal terminals LI0 to LI2. Since the left or fight shift control signal DS is logical "1", the AND circuits 530 to 532 output the input data DIX (X=0, 1, 2) of the barrel-shifter unit circuits 400 to 402. Accordingly, output the input data DIX (X= 0, 1, 2) of barrel-shifter unit circuit 400 to 402 are input to the logical signal terminals RI0 to RI2 respectively.

At first, the left or right shift control signal "DS=1" is input to the select signal control terminal LS0 of the barrel-shifter unit circuit 400, so that the right shift tri-state buffer 520 is disabled. Since logical "0" is input to the logical signal control terminal RS0 from the ground, the left shift tri-state buffer 510 is enabled so that the input data DI3 input to the select signal terminal LI0 is inverted by the left shift tri-state buffer 510 to be output from the i/o terminal I00.

Moreover, the input data DI3 is input to the select signal terminals LI1 and LI2 of the barrel-shifter unit circuits 401 and 402 and input data DI1 and DI2 are input to the logical signal terminals RI1 and RI2 thereof respectively. Since logical "0" is input to the select signal control terminals LS1 and LS2 and the logical signal control terminals RS1 and RS2 from the ground, right shift tri-state buffers 511 and 512 and left shift tri-state buffers 511 and 512 are enabled. As a result, the input data DI3 input to the select signal terminals LI1 and LI2 are inverted by the left shift tri-state buffers 511 and 512 to be output from the i/o terminals I01 and I02 respectively. The input data DI1 and DI2 are inverted by the right shift tri-state buffers 521 and 522 to be output from the i/o terminals I31 and I32 respectively.

The input data DI3 is input to the select signal terminal LI3 and logical signal terminal RI3 of the barrel-shifter unit circuit 403. Since the left or right shift control signal "DS=1" is inverted by an inverter 583 to be input to the logical signal control terminal RS3, the fight shift tri-state buffer 523 is enabled. Since logical "0"is input to the select signal control terminal LS3 from the ground, the left shift tri-state buffer 513 is enabled. As a result, the input data DI3 input to the select signal terminal LI3 and logical signal terminal RI3 is inverted by the left shift tri-state buffer 513 and the right shift tri-state buffer 523 to be output from the i/o terminal I03 and I33 respectively.

Hereupon, since the i/o terminal I10 of the barrel-shifter unit circuit 400 is connected to the i/o terminal I32 of the barrel-shifter unit circuit 403, the input data DI2 is output from the output terminal O0 of the barrel-shifter unit circuit 400 as the output data DO0. Moreover, since the i/o terminal I11 of the barrel-shifter unit circuit 401 is connected to the terminal I33 of the barrel-shifter unit circuit 403, the input data DI3 is output from the output terminal O1 of the barrel-shifter unit circuit 401 as the output data DO1.

Accordingly, the input data DI2 and DI3 are shifted right by 2 bits to be output from the output terminals O0 and O1 of the barrel shifter unit circuits 100 and 101 as the output data DO0 and DO1 respectively.

Since the i/o terminal I12 of the barrel-shifter unit circuit 402 is connected to the i/o terminal I01 of the barrel-shifter unit circuit 401, the input data DI3 is output from the output terminal O2 of the barrel-shifter unit circuit 402 as the output data DO2. Since the i/o terminal I13 of the barrel-shifter unit circuit 403 is connected to the terminal I02 of the barrel-shifter unit circuit 402, the input data DI3 is output from the output terminal O3 of the barrel-shifter unit circuit 403 as the output data DO3. In this way, the uppermost input data DI3 is supplied to high order bits to perform sign extension.

Although the left 1-bit shift and the right 2-bit shift have been described for examples, similar operation is performed in case of left 2-bit shift, left 3-bit shift, right 1-bit shift and right 3-bit shift. In case of the 3-bit barrel-shifter illustrated in FIG. 5, data output from the output terminals O0 to O3 in each shift, i.e., the through, left 1-, left 2- and left 3-bit shifts and the through, right 1-, right 2- and right 3- bit shifts are shown in tables 4 and 5.

As described above according to the third embodiment, each of the barrel-shifter unit circuits 40X (X=0, 1, 2, 3) which constitute the barrel-shifter is provided with the tri-state buffers 51X and 52X therein which enable the bi-directional data shift and are driven by the left or right shift control signal DS and a signal complementary thereto respectively. Moreover, the barrel-shifter is provided with selectors 540 to 542 for outputting the input data DIX of the barrel-shifter unit circuits 400 to 403 from the i/o terminals I0X thereof at left shift and from the i/o terminals I3X thereof at right shift and AND circuits 530 to 532 for outputting ground level logical "0" from the i/o terminals I3X at left shift. As a result, it is possible to perform filling zero at left shift and sign extension at right shift by a barrel-shifter which occupies less area than conventional barrel-shifters. Particularly the barrel-shifter disclosed in the third embodiment is effective in case the number of transfer gates in each barrel-shifter is increased. For example, in case of the barrel-shifter described in the second embodiment, each of the filling zero tri-state buffers 301 and 311 in FIG. 4 is connected to i/o terminals (the number of which is less than that of the transfer gates in each barrel-shifter unit circuit by 1). Accordingly, as the number of the transfer gates in each barrel-shifter unit circuit increases, larger driving ability is required. When the ability for driving the tri-state buffers is increased, they occupies larger area. In the third embodiment, however, the filling zero tri-state buffers 301 and 311 illustrated in FIG. 4 is dispensable since each barrel-shifter unit circuit is provided with a selector which supplies input data or sign extension data (data input to the uppermost barrel-shifter unit circuit) thereto and an AND circuit which supplies input data or ground level logical "0" thereto.

As described above, since the increase of circuit scale can be restrained in the third embodiment, the area for circuit pattern can be made smaller.

[Fourth Embodiment]

The present invention is not limited to the first, second and third embodiments set forth above, but can be modified variously, for example, the barrel-shifter illustrated in FIG. 5 may be of arbitrary number of bits or may be composed of barrel-shifter unit circuits (FIG. 1 and FIG. 6) each having arbitrary number of transfer gates.

Figure 8:
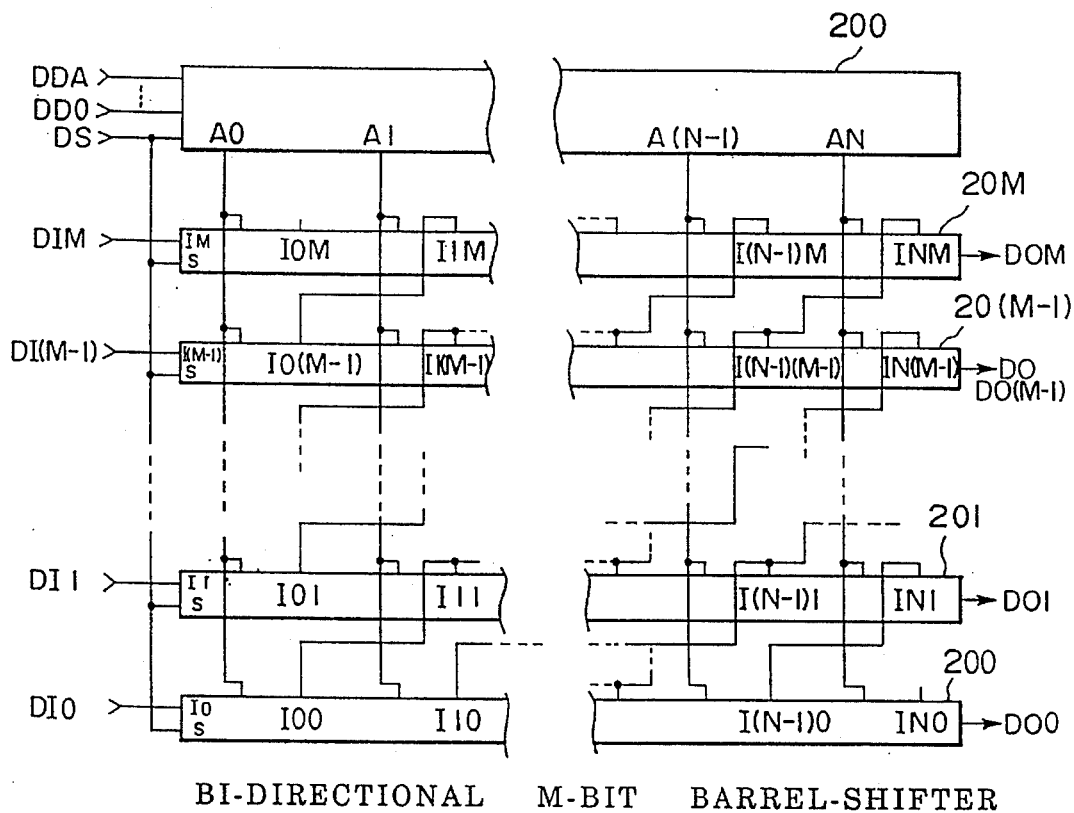
FIG. 8 is a block diagram showing an arrangement of a bi-directional M-bit barrel-shifter corresponding to the first embodiment of the present invention.
Figure 9:
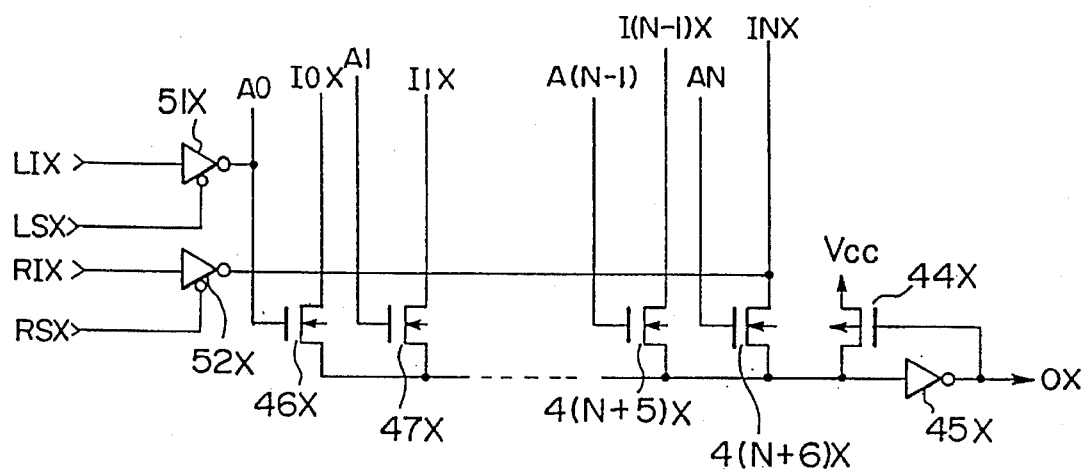
FIG. 9 is a circuit diagram of a barrel-shifter unit circuit in FIG. 8.

FIG. 8 is a block diagram of an N-bit barrel-shifter which is the barrel-shifter illustrated in FIG. 2 modified to be capable of N-bit shift (N≧ 1, natural number). FIG. 9 shows barrel-shifter unit circuit 200 to 20M (M ≧1, natural number) of the N-bit barrel-shifter illustrated in FIG. 8. In the barrel-shifter illustrated in FIG. 9, the decoder 200 enables one of (N+ 1) address terminals A0 to AN and a plurality of shift amount data signals DD0 and DDA and the left or right shift control signal DS are input thereto. Signals output from the decoder 200, i.e., address signals input to the address terminals A0 to AN are shown in tables 6 and 7. Table 6 shows a case of left shift wherein the left or fight shift control signal DS is logical "0". Table 7 shows a case of right shift wherein the left or right shift control signal DS is logical "1". Left or right shift is performed in response to the signal (address signal) output from the decoder. Tables 8 and 9 show data output from the output terminals O0 to OM in each shift in the bi-directional N-bit barrel-shifter illustrated in FIG. 8 in case N=M. Tables 8 and 9 show output data in left shift and right shift respectively.

TABLE 6

| operation | A0 | A1 | A2 | A3 | A4 | ... | A(N–1) | AN |
|---|---|---|---|---|---|---|---|---|
| through | 1 | 0 | 0 | 0 | 0 | ... | 0 | 0 |

TABLE 6-continued

| operation | A0 | A1 | A2 | A3 | A4 | ... | A(N−1) | AN |
|---|---|---|---|---|---|---|---|---|
| left 1-bit shift | 0 | 1 | 0 | 0 | 0 | ... | 0 | 0 |
| left 2-bit shift | 0 | 0 | 1 | 0 | 0 | ... | 0 | 0 |
| left 3-bit shift | 0 | 0 | 0 | 1 | 0 | ... | 0 | 0 |
| left 4-bit shift | 0 | 0 | 0 | 0 | 1 | ... | 0 | 0 |
| . | . | . | . | . | . | ... | . | . |
| . | . | . | . | . | . | ... | . | . |
| . | . | . | . | . | . | ... | . | . |
| left (N−1)-bit shift | 0 | 0 | 0 | 0 | 0 | ... | 1 | 0 |
| left N-bit shift | 0 | 0 | 0 | 0 | 0 | ... | 0 | 1 |

TABLE 7

| operation | A0 | A1 | A2 | A3 | A4 | ... | A(N−1) | AN |
|---|---|---|---|---|---|---|---|---|
| through | 0 | 0 | 0 | 0 | 0 | ... | 0 | 0 |
| right 1-bit shift | 0 | 0 | 0 | 0 | 0 | ... | 0 | 0 |
| . | . | . | . | . | . | ... | . | . |
| . | . | . | . | . | . | ... | . | . |
| . | . | . | . | . | . | ... | . | . |
| right (N−4)-bit shift | 0 | 0 | 0 | 0 | 1 | ... | 0 | 0 |
| right (N−3)-bit shift | 0 | 0 | 0 | 1 | 0 | ... | 0 | 0 |
| right (N−2)-bit shift | 0 | 0 | 1 | 0 | 0 | ... | 0 | 0 |
| right (N−1)-bit shift | 0 | 1 | 0 | 0 | 0 | ... | 0 | 0 |
| right N-bit shift | 1 | 0 | 0 | 0 | 0 | ... | 0 | 0 |

TABLE 8

| operation | O0 | O1 | O2 | O3 | O4 | ... | O(M−1) | OM |
|---|---|---|---|---|---|---|---|---|
| through | DI0 | DI1 | DI2 | DI3 | DI4 | ... | DI(M−1) | DIM |
| left 1-bit shift | — | DI0 | DI1 | DI2 | DI3 | ... | DI(M−2) | DI(M−1) |
| left 2-bit shift | — | — | DI0 | DI1 | DI2 | ... | DI(M−3) | DI(M−2) |
| left 3-bit shift | — | — | — | DI0 | DI1 | ... | DI(M−4) | DI(M−3) |
| left 4-bit shift | — | — | — | — | DI0 | ... | DI(M−5) | DI(M−4) |
| | — | — | — | — | | ... | . | . |
| | — | — | — | — | | ... | . | . |
| | — | — | — | — | | ... | . | . |
| left (N−1)-bit shift | — | — | — | — | — | ... | DI0 | DI1 |
| left N-bit shift | — | — | — | — | — | ... | — | DI0 |

TABLE 9

| operation | O0 | O1 | O2 | O3 | O4 | ... | O(M−1) | OM |
|---|---|---|---|---|---|---|---|---|
| through | DI0 | DI1 | DI2 | DI3 | DI4 | ... | DI(M−1) | DIM |
| right 1-bit shift | DI1 | DI2 | DI3 | DI4 | DI5 | ... | DIM | — |
| right 2-bit shift | DI2 | DI3 | DI4 | DI5 | DI6 | ... | — | — |
| right 3-bit shift | DI3 | DI4 | DI5 | DI6 | DI7 | ... | — | — |
| right 4-bit shift | DI4 | DI5 | DI6 | DI7 | DI8 | ... | — | — |
| . | . | . | . | . | . | ... | . | . |
| . | . | . | . | . | . | ... | . | . |
| . | . | . | . | . | . | ... | . | . |
| right (N−1)-bit shift | DI(M−1) | DIM | — | — | — | ... | — | — |
| right N-bit shift | DIM | — | — | — | — | ... | — | — |

Figure 10:
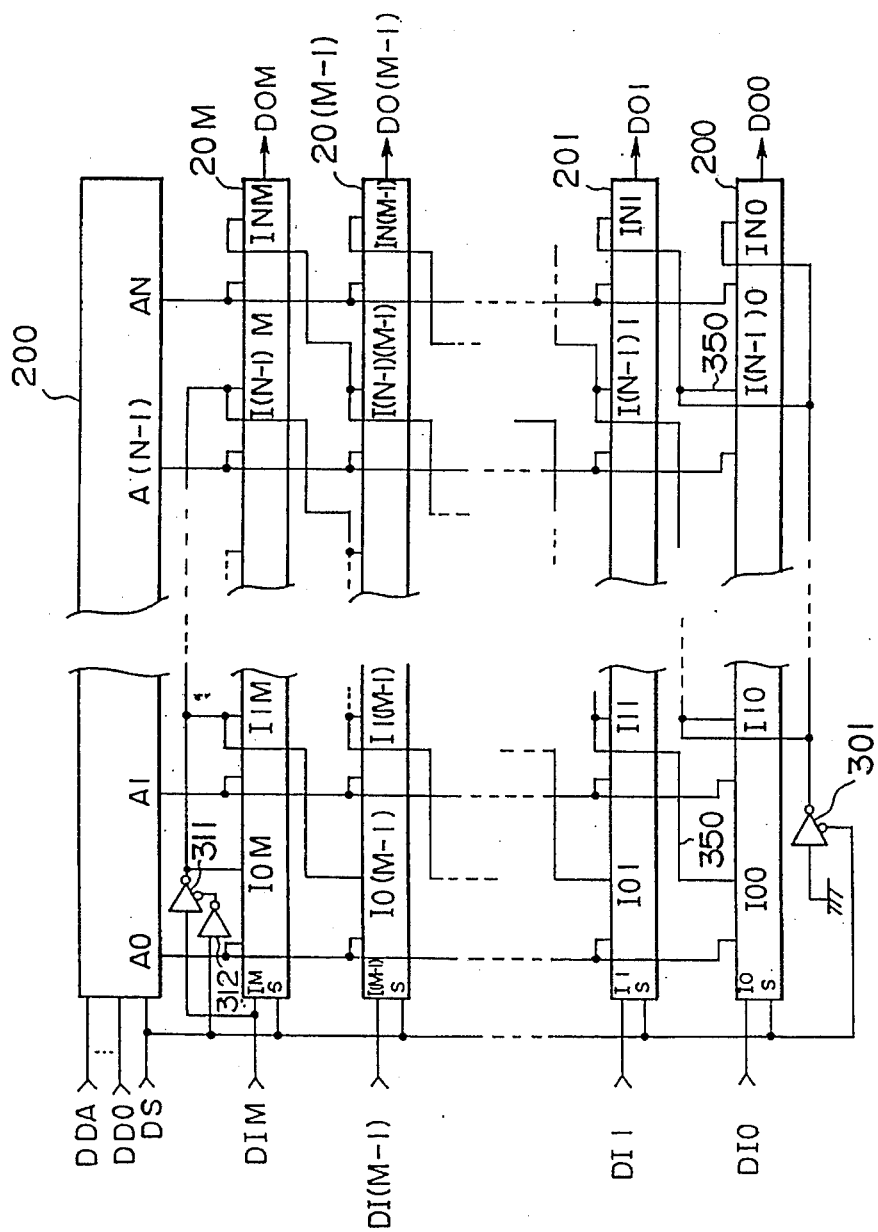
FIG. 10 is a block diagram showing an arrangement of a bi-directional M-bit barrel-shifter corresponding to the second embodiment of the present invention.

FIG. 10 shows the block diagram of the barrel-shifter illustrated in FIG. 4 that is modified to be capable of N-bit shift (N≧1, natural number). The barrel-shifter unit circuits 200 to 20M (M≧1, natural number) of the N-bit barrel-shifter is the same as those illustrated in FIG. 9. The output signal (address signal) of the decoder 200 is also the same as that in tables 6 and 7. Left or right shift is performed in response to the output signal of the decoder 200. Tables 10 and 11 show data output from the output terminals O0 to OM in each shift in the bi-directional N-bit barrel-shifter illustrated in FIG. 10 in case N=M, wherein tables 10 and 11 show output data in left shift and right shift respectively. Tables 12 and 13 show data output from the output terminals O0 to OM in each shift in the bi-directional N-bit barrel-shifter illustrated in FIG. 10 in case N<M, wherein tables 12 and 13 show output data in left shift and right shift respectively.

[Fifth Embodiment]

TABLE 10

| operation | O0 | O1 | O2 | O3 | O4 | ... | O(M−1) | OM |
|---|---|---|---|---|---|---|---|---|
| through | DI0 | DI1 | DI2 | DI3 | DI4 | ... | DI(M−1) | DIM |
| left 1-bit shift | 0 | DI0 | DI1 | DI2 | DI3 | ... | DI(M−2) | DI(M−1) |
| left 2-bit shift | 0 | 0 | DI0 | DI1 | DI2 | ... | DI(M−3) | DI(M−2) |
| left 3-bit shift | 0 | 0 | 0 | DI0 | DI1 | ... | DI(M−4) | DI(M−3) |
| left 4-bit shift | 0 | 0 | 0 | 0 | DI0 | ... | DI(M−5) | DI(M−4) |
| . | . | . | . | . | . | ... | . | . |
| . | . | . | . | . | . | ... | . | . |
| left (N−1)-bit shift | 0 | 0 | 0 | 0 | 0 | ... | DI0 | DI1 |
| left N-bit shift | 0 | 0 | 0 | 0 | 0 | ... | 0 | DI0 |

TABLE 11

| operation | O0 | O1 | O2 | O3 | O4 | ... | O(M−1) | OM |
|---|---|---|---|---|---|---|---|---|
| through | DI0 | DI1 | DI2 | DI3 | DI4 | ... | DI(M−1) | DIM |
| right 1-bit shift | DI1 | DI2 | DI3 | DI4 | DI5 | ... | DIM | DIM |
| right 2-bit shift | DI2 | DI3 | DI4 | DI5 | DI6 | ... | DIM | DIM |
| right 3-bit shift | DI3 | DI4 | DI5 | DI6 | DI7 | ... | DIM | DIM |
| right 4-bit shift | DI4 | DI5 | DI6 | DI7 | DI8 | ... | DIM | DIM |
| . | . | . | . | . | . | ... | . | . |
| . | . | . | . | . | . | ... | . | . |
| right (N−1)-bit shift | DI(M−1) | DIM | DIM | DIM | DIM | ... | DIM | DIM |
| right N-bit shift | DIM | DIM | DIM | DIM | DIM | ... | DIM | DIM |

TABLE 12

| operation | O0 | O1 | O2 | O3 | O4 | ... | O(M−1) | OM |
|---|---|---|---|---|---|---|---|---|
| through | DI0 | DI1 | DI2 | DI3 | DI4 | ... | DI(M−1) | DIM |
| left 1-bit shift | 0 | DI0 | DI1 | DI2 | DI3 | ... | DI(M−2) | DI(M−1) |
| left 2-bit shift | 0 | 0 | DI0 | DI1 | DI2 | ... | DI(M−3) | DI(M−2) |
| left 3-bit shift | 0 | 0 | 0 | DI0 | DI1 | ... | DI(M−4) | DI(M−3) |
| left 4-bit shift | 0 | 0 | 0 | 0 | DI0 | ... | DI(M−5) | DI(M−4) |
| . | . | . | . | . | . | ... | . | . |
| . | . | . | . | . | . | ... | . | . |
| left (N−1)-bit shift | 0 | 0 | 0 | 0 | 0 | ... | DI(M+1−N) | DI(M−N) |
| left N-bit shift | 0 | 0 | 0 | 0 | 0 | ... | 0 | DI(M+1−N) |

TABLE 13

| operation | O0 | O1 | O2 | O3 | O4 | ... | O(M−1) | OM |
|---|---|---|---|---|---|---|---|---|
| through | DI0 | DI1 | DI2 | DI3 | DI4 | ... | DI(M−1) | DIM |
| right 1-bit shift | DI1 | DI2 | DI3 | DI4 | DI5 | ... | DIM | DIM |
| right 2-bit shift | DI2 | DI3 | DI4 | DI5 | DI6 | ... | DIM | DIM |
| right 3-bit shift | DI3 | DI4 | DI5 | DI6 | DI7 | ... | DIM | DIM |
| right 4-bit shift | DI4 | DI5 | DI6 | DI7 | DI8 | ... | DIM | DIM |
| . | . | . | . | . | . | ... | . | . |
| . | . | . | . | . | . | ... | . | . |
| right (N−1)-bit shift | DI(M−1) | DI(M−N+1) | ... | ... | ... | ... | DIM | DIM |
| right N-bit shift | DI(M−N+1) | DI(M−N+2) | ... | ... | ... | ... | DIM | DIM |

[Sixth Embodiment]

Figure 11:
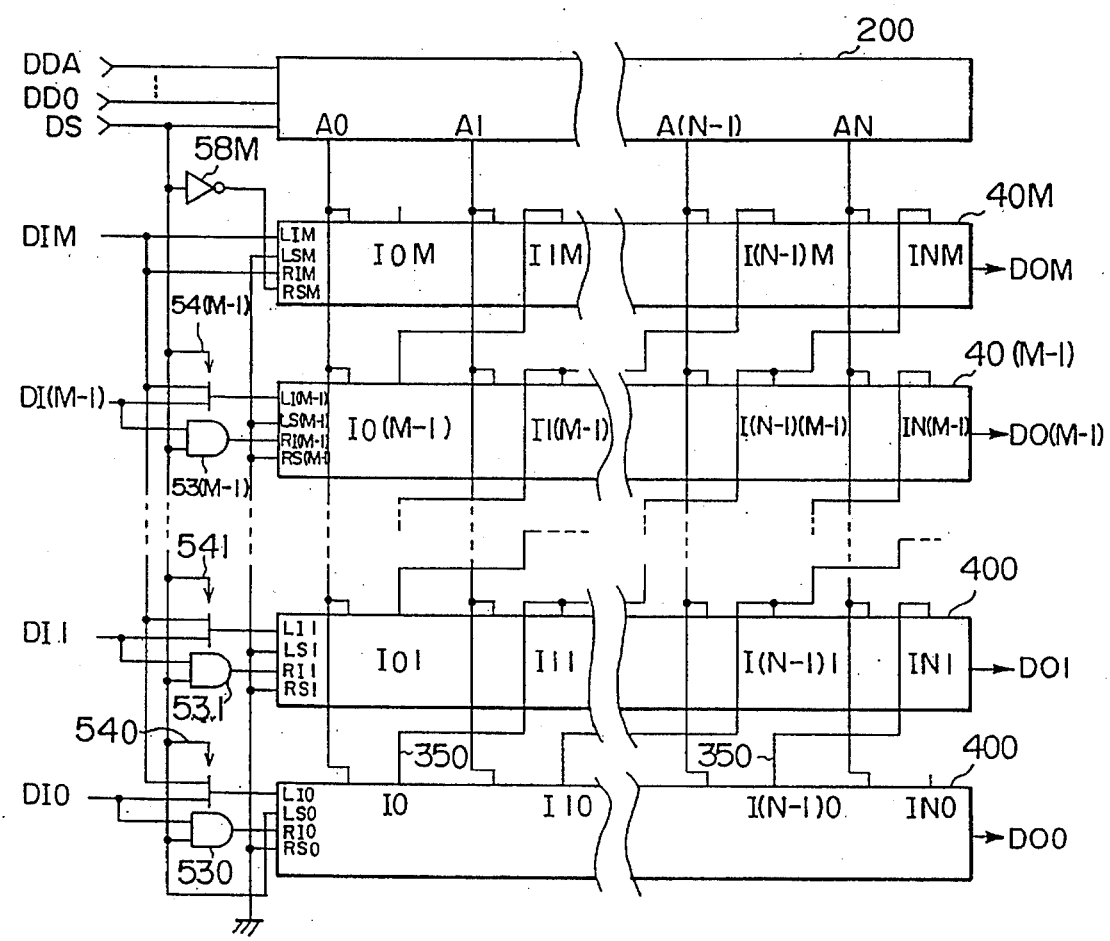
FIG. 11 is a block diagram showing an arrangement of a bi-directional M-bit barrel-shifter corresponding to the third embodiment of the present invention.
Figure 12:
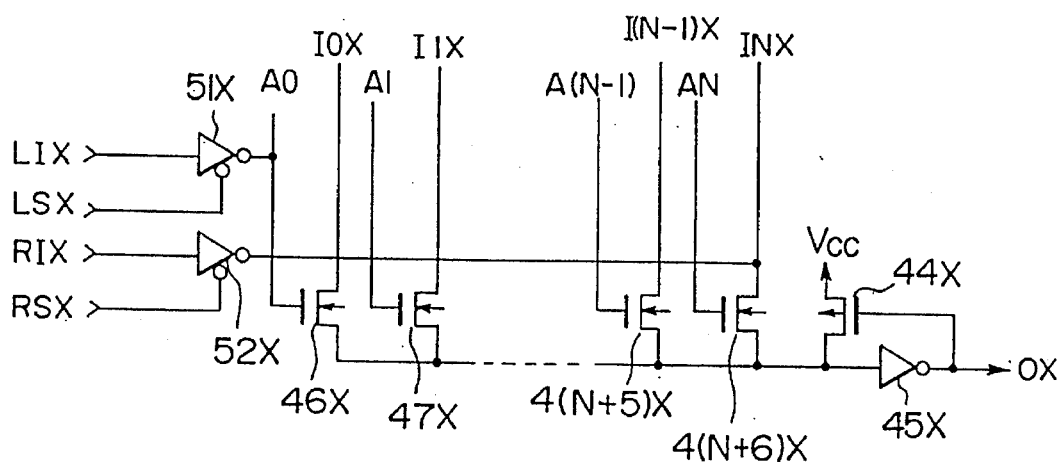
FIG. 12 is a circuit diagram of a barrel-shifter unit circuit in FIG. 11.
Figure 13:
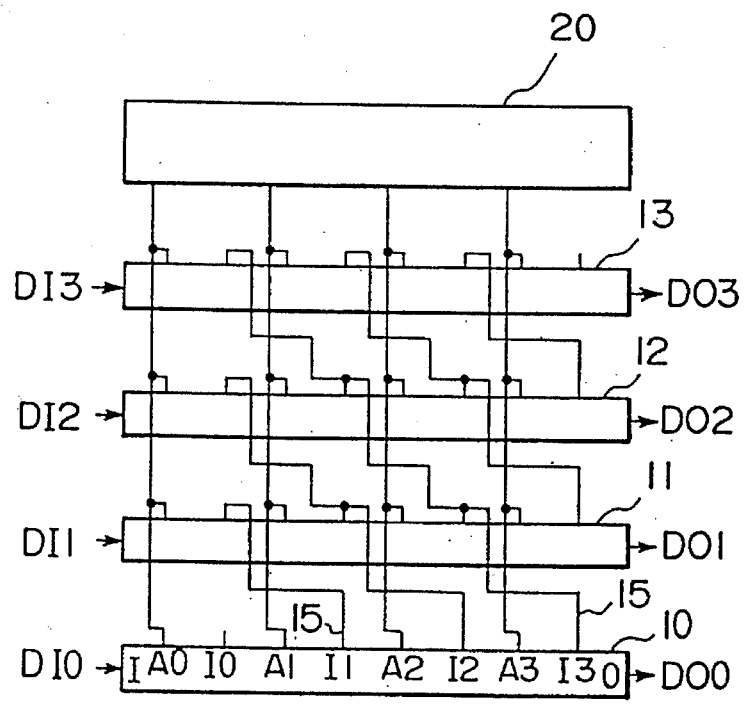
FIG. 13 is a block diagram showing an arrangement of a conventional right shift 4-bit barrel-shifter.
Figure 14:
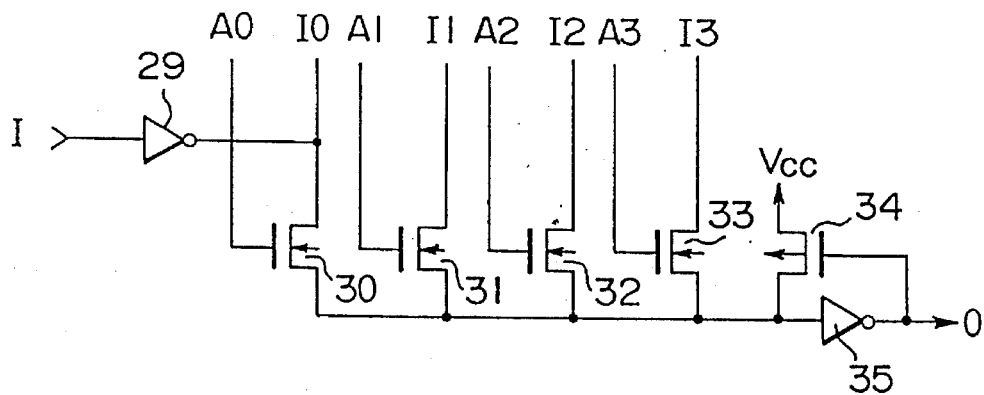
FIG. 14 is a circuit diagram of a barrel-shifter unit circuit in FIG. 13.
Figure 15:
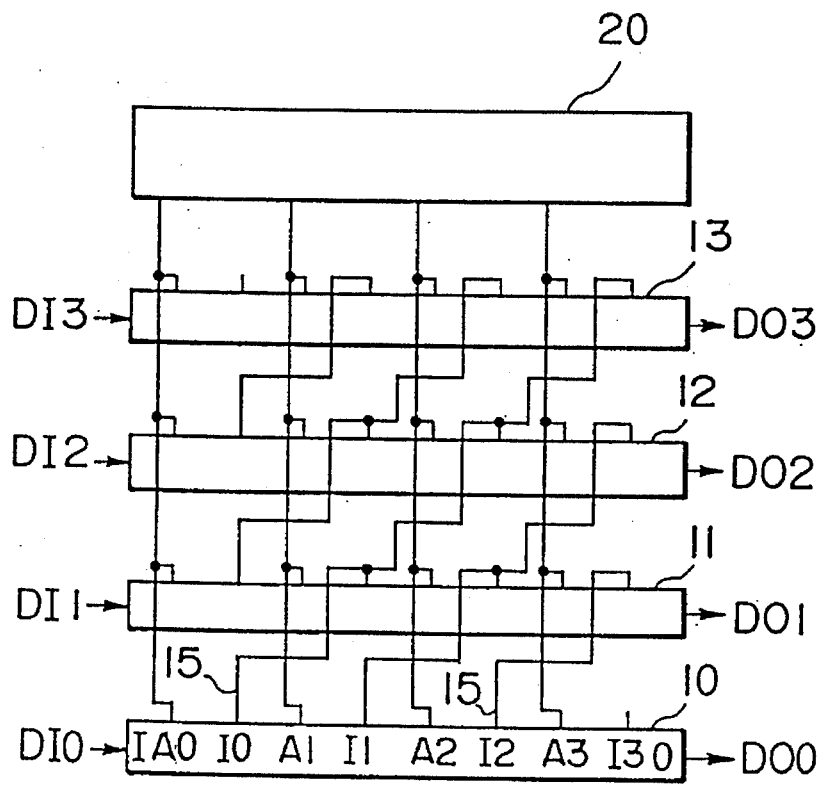
FIG. 15 is a block diagram showing an arrangement of a conventional left shift 4-bit barrel-shifter and FIG. 16 is a block diagram showing an arrangement of a conventional bi-directional data shift 4-bit barrel-shifter.
Figure 16:
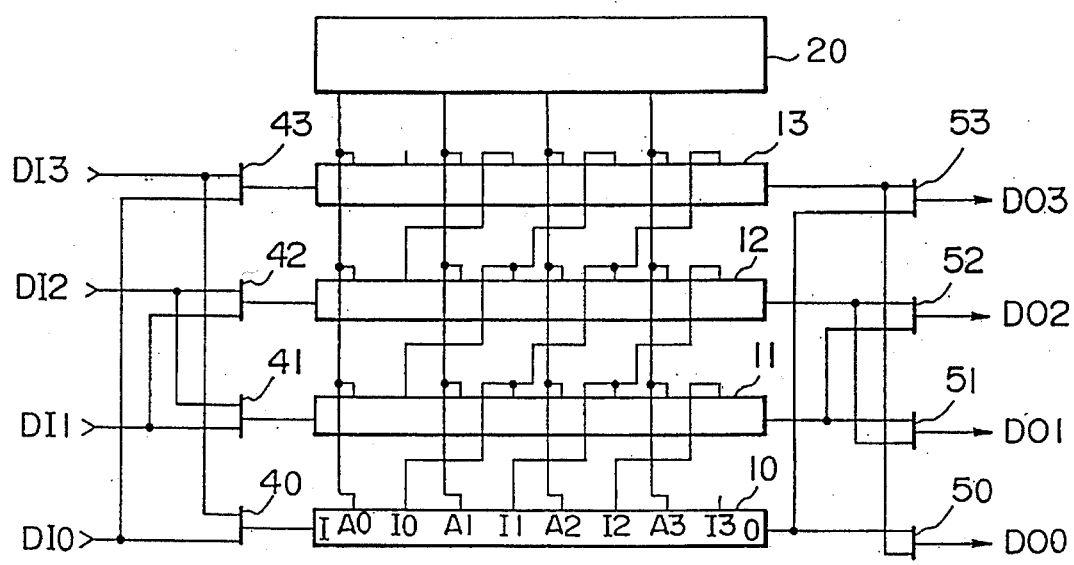

FIG. 11 shows the block diagram of the N-bit barrel-shifter illustrated in FIG. 5 that is modified to be capable of performing N-bit shift (N≧1, natural number). FIG. 12 shows the N-bit barrel-shifter unit circuits 400 to 40M (M≧N, natural number). The output data of the decoder 200 in FIG. 11 are the same as those in tables 6 and 7. Left or right shift is performed in response to the output signal of the decoder. Data output from the output terminals O0 to OM in each shift in the bi-directional N-bit barrel-shifter illustrated in FIG. 11 in case N≧M are the same as those in case of the bi-directional N- bit barrel-shifter illustrated in FIG. 10.

Various modifications are also possible by employing circuits other than those of the selectors, transfer gates, tri-state buffers and decoders described in the above (first to sixth) embodiments.

INDUSTRIAL UTILIZATION

According to the first aspect of the invention, it is possible to perform bi-directional data shift using a barrel-shifter which occupies less area than conventional barrel-shifters since each barrel-shifter unit circuit which constitutes the barrel-shifter is provided with a right shift tri-state buffer and a left shift tri-state buffer wherein either of the right and left shift tri-state buffers is enabled in response to a left or right shift control signal.

According to the second aspect of the invention, it is possible to fill the low order bits with zero in left shift and perform sign extension in the high order bits in right shift since the barrel-shifter is provided with a filling zero circuit for inputting ground level logical "0" to the i/o terminals excepting the input end i/o terminal of the lowermost barrel-shifter unit circuit when the right shift tri-state buffer is enabled and a sign extension circuit for inputting the input data of the uppermost barrel-shifter unit circuit to the i/o terminals excepting the output end i/o terminal thereof when the left shift tri-state buffer is enabled.

According to the third aspect of the invention, it is possible to perform the bi-directional data shift since the right and left shift tri-state buffers are provided in the uppermost and lowermost barrel-shifter unit circuits in the barrel-shifter respectively for enabling either of the left and right shift tri-state buffers in response to the left or right shift control signal. Moreover, each barrel-shifter unit circuit excepting the uppermost and lowermost barrel-shifter unit circuits in the barrel-shifter is provided with a selector, which outputs the input data of each barrel-shifter unit circuit from the input end i/o terminal of the uppermost barrel-shifter unit circuit when the left shift tri-state buffer is enabled and outputs the input data of the uppermost barrel-shifter unit circuit from the input end i/o terminal thereof when the right shift tri-state buffer is enabled, and a logic circuit, which outputs ground level logical "0" from the input end i/o terminal thereof when the left shift tri-state buffer is enabled and outputs the input data of each barrel-shifter unit circuit from the output end i/o terminal thereof, so that it is possible to perform filling zero at left shift and sign extension at right shift using a barrel-shifter which occupies less area.

I claim:

1. A barrel-shifter comprising

M (M≧1, natural number) stages of barrel-shifter unit circuits each composed of first to Nth i/o nodes (N≧2, natural number);

an output terminal;

an input terminal;

first to Nth switching elements respectively connected between said output terminal and said first to Nth i/o nodes; and a left/right shift selection circuit having an input portion connected to said input terminal and output portions connected to said first i/o node and Nth i/o node, wherein said left/right shift selection circuit which receives a right shift signal or left shift signal and outputs data corresponding to data which are input to said input terminal to said first i/o node in response to said left shift signal while it outputs data corresponding to that which are input to said input terminal to said Nth i/o node in response to said right shift signal;

characterized in that said barrel-shifter further comprises:

a decoder circuit for commonly driving said first to Nth switching elements of each stage barrel-shifter unit circuit and for making only one of said first to Nth switching elements conductive; and connecting lines for connecting i/o nodes of adjacent barrel-shifter unit circuits to one another wherein the Qth (1≦Q≦(N−1), natural number) connecting line of first to (N−1)th connecting lines between a Pth (1≦P<M) stage and a (P+1)th stage barrel-shifter unit circuits connects the Qth i/o node of the Pth (1≦P<M) stage barrel-shifter unit circuit to the (Q+1)th i/o node of the (P+1)th stage barrel-shifter unit circuit.

2. A barrel-shifter according to claim 1, said left/right shift selection circuit is composed of a first tri-state buffer which is connected between said input terminal and said first i/o node and is driven by said left shift signal; and a second tri-state buffer which is connected between said input terminal and said Nth i/o node and is driven by said right shift signal.

3. A barrel-shifter according to claim 1, characterized in that said barrel-shifter further comprises:

a sign extension circuit having an input portion connected to the input terminal of said Mth stage barrel-shifter unit circuit among said M stages of barrel-shifter unit circuits and output portions connected to said first to (N−1)th i/o nodes of said Mth stage barrel-shifter unit circuit, said sign extension circuit outputting data corresponding to an Mth data which is input to the input terminal of said Mth stage barrel-shifter unit circuit to said first to (N−1)th i/o nodes of said Mth stage barrel-shifter unit circuit in response to said right shift signal; and a filling zero circuit having an output portion connected to second to Nth i/o nodes of said first stage barrel-shifter unit circuit among said M stages of barrel-shifter unit circuits and an input portion connected to a node corresponding to zero potential, said filling zero circuit outputting data corresponding to zero potential to said second to Nth i/o nodes of said first stage barrel-shifter unit circuit.

4. A barrel-shifter according to claim 1, characterized in that said right and left shift signals are complementary to each other.

5. A barrel-shifter comprising

M (M≧1, natural number) stages of barrel-shifter unit circuits each composed of:

first to Nth i/o nodes (N≧2, natural number);

an output terminal;

an input terminal;

first to Nth switching elements respectively connected between said output terminal and said first to Nth i/o nodes; and a left/right shift selection circuit having an input portion connected to said input terminal and output portions connected to said first i/o node and Nth i/o node, wherein said left/right shift selection circuit which receives a right shift signal or left shift signal and outputs data corresponding to that input to said input terminal to said first i/o node in response to said left signal while it outputs data corresponding to that input to said input terminal to said Nth i/o node in response to said right shift signal;

characterized in that said barrel-shifter further comprises:

a decoder circuit for commonly driving said first to Nth switching elements of each stage barrel,shifter unit circuit and for making only one of said first to Nth switching elements conductive;

connecting lines for connecting i/o nodes of adjacent barrel-shifter unit circuits one another wherein the Qth ($1<Q\leq(N-1)$, natural number) connecting line of first to (N−1)th connecting lines between a Pth ($1\leq P<M$) stage and a (P+1)th stage barrel-shifter unit circuits connects the Qth i/o node of the Pth ($1\leq P<M$) stage barrel-shifter unit circuit to the (Q+1)th i/o node of the (P+1)th stage barrel-shifter unit circuit;

a sign extension circuit having an input portion connected to the input terminal of said Mth stage barrel-shifter unit circuit among said M stages of barrel-shifter unit circuits and output portions connected to said first to (N−1)th i/o nodes of said Mth stage barrel-shifter unit circuit, said sign extension circuit outputting data corresponding to an Mth data input to the input terminal of said Mth stage barrel-shifter unit circuit to said first to (N−1)th i/o nodes of said Mth stage barrel-shifter unit circuit in response to said right shift signal; and a filling zero circuit having an output portion connected to second to Nth i/o nodes of said first stage barrel-shifter unit circuit among said M stages of barrel-shifter unit circuits and an input portion connected to a node corresponding to zero potential, said filling zero circuit outputting data corresponding to zero potential to said second to Nth i/o nodes of said first stage barrel-shifter unit circuit in response to said left shift signal.

6. A barrel-shifter according to claim 5, characterized in that said left/right shift selection circuit is composed of:

a first tri-state buffer which is connected between said input terminal and said first i/o node and is driven by said left shift signal; and a second tri-state buffer which is connected between said input terminal and said Nth i/o node and is driven by said right shift signal.

7. A barrel-shifter according to claim 5, characterized in that said sign extension circuit and said filling zero circuit are tri-state buffers respectively.

8. A barrel-shifter according to claim 5, characterized in that said right and left shift signals are complementary to each other.

9. A barrel-shifter comprising:

M ($M\geq 1$, natural number) stages of barrel-shifter unit circuits each composed of first to Nth i/o nodes ($N\geq 2$, natural number);

an output terminal;

an input terminal;

first to Nth switching elements respectively connected between said output terminal and said first to Nth i/o nodes;

a control circuit having an input portion connected to said input terminal and output portions connected to said first and Nth i/o nodes:

a decoder circuit for commonly driving said first to Nth switching elements of each stage barrel-shifter unit circuit and for making only one of said first to Nth switching elements conductive:

connecting lines for connecting i/o nodes of adjacent barrel-shifter unit circuits one another wherein the Qth ($1<Q\leq(N-1)$, natural number) connecting line of first to (N−1)th connecting lines between a Pth ($1\leq P<M$) stage and a (P+1)th stage barrel-shifter unit circuits connects the Qth i/o node of the Pth ($1\leq P<M$) stage barrel-shifter unit circuit to the (Q+1)th i/o node of the (P+1)th stage barrel-shifter unit circuit:

a right shift signal node which is connected to said control circuit of each stage of said barrel-shifter unit circuits and to which a right shift signal is input to control the operation of said control circuit; and a left shift signal node which is connected to said control circuit of each stage of said barrel-shifter unit circuits and to which a left shift signal is input to control the operation of said control circuit; characterized in that said control circuit of said Mth stage barrel-shifter unit circuit outputs data corresponding to that input to said input terminal to said first i/o node and outputs data corresponding to that input to said input terminal to said Nth i/o node in response to said right shift signal;

a control circuit of each of said first to (M−1)th stage barrel-shifter unit circuits outputs data corresponding to that input to the input terminal thereof to said first i/o node thereof and that corresponding to zero to the Nth i/o node thereof in response to said left shift signal, while data corresponding to that input to the input terminal of said each barrel-shifter unit circuit to the Nth i/o node thereof and data corresponding to that input to the input terminal of said Mth stage barrel-shifter unit circuit to the first i/o node thereof in response to said right shift signal.

10. A barrel-shifter according to claim 9, characterized in that said control circuit of said Mth stage barrel-shifter unit circuit comprises a tri-state buffer which is connected between said input terminal of said barrel-shifter and said Nth i/o node of said Mth stage barrel-shifter unit circuit and has a control terminal connected to said right shift signal node:

said control circuit of each of said second to (M−1)th stage barrel-shifter unit circuits comprises:

a selection circuit having an input portion connected to the input terminal of said Mth stage barrel-shifter unit circuit and that of the barrel-shifter unit circuit thereof and an output portion connected to said first i/o node thereof; and an AND circuit having an input portion connected to said let shift signal node and the input terminal of each stage barrel-shifter unit circuit and an output portion connected to said Nth i/o node thereof; and said control circuit of said first stage barrel-shifter unit circuit comprises:

a selection circuit having an input portion connected to the input terminal of said Mth stage barrel-shifter unit circuit and those of other barrel-shifter unit circuits and said input terminal of said barrel-shifter and an output portion connected to said first i/o node thereof;

a tri-state buffer having an input portion connected to the output portion of said selection circuit, an output portion connected to said first i/o node thereof and a control terminal connected to said left shift signal node; and an AND circuit having an input portion connected to said left shift signal node and input terminal of said barrel-shifter unit circuit thereof and an output portion connected to said Nth i/o node.

11. A barrel-shifter according to claim 9, characterized in that said right and left shift signals are complementary to each other.

* * * * *